US009580324B2

United States Patent
Jin et al.

(10) Patent No.: US 9,580,324 B2
(45) Date of Patent: Feb. 28, 2017

(54) METHOD FOR LOW-TEMPERATURE PREPARATION OF GRAPHENE AND OF GRAPHENE-BASED COMPOSITE MATERIAL

(71) Applicant: Wuhan University, Wuhan (Hubei Province) (CN)

(72) Inventors: Xianbo Jin, Wuhan (CN); Yanzhong Hong, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 14/634,742

(22) Filed: Feb. 28, 2015

(65) Prior Publication Data

US 2015/0175426 A1 Jun. 25, 2015

Related U.S. Application Data

(63) Continuation-in-part of application No. PCT/CN2013/001019, filed on Aug. 28, 2013.

(30) Foreign Application Priority Data

Aug. 28, 2012 (CN) .......................... 2012 1 0309194

(51) Int. Cl.
  *C01B 31/04* (2006.01)
  *B82Y 30/00* (2011.01)
  *B82Y 40/00* (2011.01)

(52) U.S. Cl.
  CPC .......... *C01B 31/0446* (2013.01); *B82Y 30/00* (2013.01); *B82Y 40/00* (2013.01); *C01B 31/0469* (2013.01)

(58) Field of Classification Search
  CPC . C01B 31/0469; C01B 31/0446; C01B 31/04; C01B 31/0407; C01B 31/0415; C01B 2204/04; C01B 2204/20; C01B 2204/22; C01B 2204/00; C01B 2204/02; C01B 2204/06; C01B 2204/065; C01B 2204/24; B82Y 40/00; B82Y 30/00

(Continued)

(56) References Cited

U.S. PATENT DOCUMENTS

2015/0175426 A1\* 6/2015 Jin et al. ............. C01B 31/0469
423/448

FOREIGN PATENT DOCUMENTS

WO 2011/159922 \* 12/2011 ............. C01B 31/02

OTHER PUBLICATIONS

Definition of graphene, accessed online at http://dictionary.reference.com/browse/grapheme on Jan. 10, 2016.\*

(Continued)

*Primary Examiner* — Daniel C McCracken
(74) *Attorney, Agent, or Firm* — Wayne & King LLC

(57) ABSTRACT

Provided is a method for room-pressure and low-temperature preparation of graphene, comprising: heat treating a compound of graphite oxide and sulfuric acid in either room pressure or negative pressure at a temperature between 50 and 400° C., thus converting graphite oxide into graphene. Also provided is a method for low-temperature preparation of a graphene composite material. The acquired graphene and graphene composite material are applicable in optical materials, electrically-conductive materials, sensor materials, catalytic materials, battery materials, and supercapacitor materials.

14 Claims, 9 Drawing Sheets

(58) Field of Classification Search
USPC .......................................................... 423/448
See application file for complete search history.

(56) References Cited

OTHER PUBLICATIONS

Hong, et al., Sulfuric Acid Intercalated Graphite Oxide for Graphene Preparation, Scientific Reports 2013; 3(3439): 1-6 (published Dec. 6, 2013).*

* cited by examiner

METHOD FOR LOW-TEMPERATURE PREPARATION OF GRAPHENE AND OF GRAPHENE-BASED COMPOSITE MATERIAL

CROSS-REFERENCE TO RELATED APPLICATIONS

This application is a continuation-in-part of International Patent Application No. PCT/CN2013/001019 with an international filing date of Aug. 28, 2013, designating the United States, now pending, and further claims priority benefits to Chinese Patent Application No. 201210309194.4 filed Aug. 28, 2012. The contents of both of the aforementioned applications, including any intervening amendments thereto, are incorporated herein by reference.

TECHNICAL FIELD

The present invention relates to normal-pressure and low-temperature preparation methods of graphene and of graphene-based composite material, belonging to the technical field of preparation of novel carbon and of carbon-based composite material.

BACKGROUND OF THE PRESENT INVENTION

As a kind of novel carbon material of a two-dimensional plane structure, graphene, due to its excellent electron transmission performance, high specific surface area and ultrahigh thermal conductivity and electrical conductivity, has many potential applications in the fields such as super capacitor materials, liquid crystal devices, electro-catalysts and sensors.

The common preparation methods of graphene include: mechanical exfoliation, vapor deposition, exfoliation of graphite oxide by (electrical) chemical reduction, exfoliation of graphite oxide by high-temperature expansion, etc. The exfoliation of graphite oxide by high-temperature expansion is mostly likely to be used in the mass production of graphene. However, the exfoliation of oxide graphite by expansion has a starting temperature over 550° C. and is generally performed in an inert atmosphere or in vacuum at 900-1100° C., resulting in severe conditions and high energy consumption. Recently, some researchers have realized the low-temperature exfoliation of graphite oxide in high vacuum. However, as the exfoliation of oxide graphite by expansion is a process in which a large amount of gas will be generated, realizing a high degree of vacuum becomes more difficult. Hence, this method is unsuitable for the mass production of graphene. In addition, with regard to the preparation of graphene by using graphite oxide as raw material, it is still difficult to prepare the graphite oxide itself.

It can be seen that the existing graphene preparation technologies or processes are complicated, or require expensive reductants or too high temperature, or has high energy consumption or even explosion risks, or the like. The preparation methods of graphene-based composite material developed on the basis of the existing graphene preparation technologies has the similar difficulties. Therefore, it is necessary to further develop preparation technologies of graphene and graphene-based composite material, which are low in cost and suitable for mass production.

SUMMARY OF THE PRESENT INVENTION

In view of the above deficiencies, the technical problem to be solved in the present invention is to provide a low-temperature preparation method of graphene and develop a preparation technology of novel graphene-based composite material on this basis.

In the present invention, the conversion from graphite oxide to graphene is explored. Researches have shown that, during the separation of graphite oxide soaked in the sulfuric acid solution and in the case of retaining the sulfuric acid in the separated solid product, the obtained compound agglomerates of graphite oxide and sulfuric acid may be quickly expand at a very low temperature, with the resulting product of expansion being graphene. Based on this important experimental discovery, the present invention provides a new graphene preparation method with low cost, small pollution and mild condition. This method may realize the low-temperature preparation of graphene, and is simple and suitable for mass production.

The sulfuric acid in the present invention is $H_2SO_4$ rather than $H_2SO_4$ aqueous solution.

The preparation solution of graphene provided by the present invention will be described as below.

A low-temperature preparation method of graphene is provided, where a compound of graphite oxide and sulfuric acid is heat treated in either normal pressure or negative pressure at 50-400° C. so that the graphite oxide is converted into graphene.

The graphite oxide is of a single-layer or multi-layer graphene oxide structure.

The compound of graphite oxide and sulfuric acid is a compound obtained by soaking graphite oxide in sulfuric acid and then performing solid-liquid separation.

The compound of graphite oxide and sulfuric acid may also be a compound obtained by oxidizing graphite in a system containing sulfuric acid into graphite oxide and then performing solid-liquid separation.

In the solution, preferably, the heat treatment lasts for 0.5-40 min.

In the solution, in the compound of graphite oxide and sulfuric acid, sulfur in the sulfuric acid is preferably 1%-9% of the total mass of graphite oxide and sulfuric acid.

In the solution, the heat treatment of the compound of graphite oxide and sulfuric acid may be performed in the atmosphere of one or more of air, nitrogen, argon, oxygen, hydrogen, carbon dioxide and ammonia gas.

In the solution, the heating during the heat treatment includes electric heating, microwave heating, solar heating or infrared heating.

The existent morphology of the graphite oxide/sulfuric acid compound may be powder, film or solid block. The existent morphology of the prepared graphene may be powder, film or solid block.

In the compound of graphite oxide and sulfuric acid, the sulfuric acid may be adsorbed in the graphite oxide, or embedded into lattices of the graphite oxide in a form of sulfuric acid molecules to form an inclusion compound, or be a combination of the both. The compound of graphite oxide and sulfuric acid exists mainly in a form of apparent solid. As both the sulfuric acid and the graphite oxide having high specific surface activity have strong water absorption, the compound of graphite oxide and sulfuric acid will contain a proper amount of water, and exists in a combination of solid and liquid with the increase of the liquid phase.

In the method provided by the present invention, it is clear that the presence of sulfuric acid allows the compound to be quickly expanded and converted into graphene at a low temperature. It has been indicated by tests that, when the compound is further washed to remove sulfuric acid until it is difficult to detect any sulfate radical in the filtrate with barium ions, the obtain graphite oxide material is neither expanded nor converted into graphene at 400° C. or below. However, in the presence of sulfuric acid, the agglomerates of the compound of graphite oxide and sulfuric acid may be quickly expanded at a temperature interval from 70° C. to 400° C. At the end of heat treatment, the resulting product is detected to be graphene after washed with water, indicating the occurrence of a chemical conversion from graphite oxide to graphene. Furthermore, the quantitative analysis indicates that the total amount of sulfuric acid remains unchanged when comparing the compound of graphite oxide and sulfuric acid compared with the heat treated compound of graphite oxide and sulfuric acid. In this case, after the compound of graphite oxide and sulfuric acid is soaked with water, nearly all the sulfuric acid enters the filtrate, indicating that the sulfuric acid mainly plays a dewatering and catalyzing role during the heat treatment. The graphite oxide applicable to this method of the present invention includes graphite oxide of a single-layer or multi-layer graphene oxide structure. When the graphite oxide is of a single-layer or few-layer graphene oxide structure, the conversion temperature thereof may be even lower, but without any obvious volume expansion observed. During the preparation of graphene by this method provided by the present invention, after the graphite powder is converted into graphite oxide in a system containing sulfuric acid or other strong oxidants, the graphite oxide is directly filtered, or washed with water and then dried. The washing process may be performed quickly. This is because, to realize the low-temperature conversion from graphite oxide to graphene, in this method provided by the present invention, the content of sulfuric acid in the compound is indispensable. As a result, the appropriate increase of the content of sulfuric acid in the compound is advantageous for the reduction of the heat treatment temperature, and the washing process for removal of sulfuric acid is thus not required. According to different solid-liquid separation ways, the compound of graphite oxide and sulfuric acid may be powder, film, solid block, etc. Accordingly, the graphene obtained by heat treatment may also be powder, film, solid block, etc.

In this method provided by the present invention, due to low heat treatment temperature, the heat treatment may be directly performed under atmospheric conditions. The inert atmosphere and vacuum protection implemented by the conventional high-temperature expansion process are not needed to avoid the oxidation of the carbon material, so that the heat treatment equipment for preparing graphene in the present invention is very inexpensive and readily available. In practices, simple baking ovens, low-power microwave ovens, and solar and infrared heating devices all may provide a heat source for the heat treatment of the graphite oxide. Hence, the heat treatment process merely causes small energy consumption (for example, by electrical heating) or even no energy consumption (for example, directly by solar heating).

The graphene prepared by the method of the present invention has high supper capacitor activity. It has been indicated by tests that, the electrochemical specific capacitance of the graphene prepared under different conditions may reach 400 F/g or above, and the specific capacitance of the graphene may reach 200 F/g or above under a high-rate charge/discharge condition of 1 A/g or above.

A conventional method is to first prepare graphite oxide and then wash and exfoliate the graphite oxide to obtain the graphene. During this process, the washing for removal of sulfuric acid and other impurities is very difficult, because there are lots of hydroxyl, carboxyl and other oxygen-containing groups which are prone to form hydrogen bonds with water in the graphite oxide, and the sulfuric acid is further largely embedded into the lattices of the graphite oxide. Therefore, it is both water-consuming and time-consuming if washing with water. Even washing with hydrochloric acid, it is required to repeatedly wash for many times, resulting in large discharge of waste acid and very expensive final product. Furthermore, it is likely to introduce chlorine ions into the resulting product during the acid washing process, which is very disadvantageous for many applications of the resulting product graphene.

Instead, a compound of graphite oxide and sulfuric acid is prepared as a precursor first in this method provided by the present invention, and it is very easy to prepare the precursor as not requiring removing sulfuric acid. After the heat treatment, the compound of graphite oxide and sulfuric acid is converted into a compound of graphene and sulfuric acid. In this case, as graphite oxide has been converted into graphene, the oxygen-containing groups thereof are greatly reduced and the hydrophily thereof is thus significantly reduced. As a result, sulfuric acid may be easily separated and removed from graphene.

On the basis of the graphene preparation method and principle thereof, the applicant(s) provides a preparation method of graphene-based composite material through further study. The technical solution will be described as below.

A low-temperature preparation method of graphene-based composite material is provided, including the following steps of: dispersing graphite oxide, sulfuric acid and substance to be compounded into a solution or colloid so that the graphite oxide, the sulfuric acid and the substance to be compounded are mixed with each other in form of molecules or colloid particles, then separating off the dispersing medium, and performing heat treatment in either normal pressure or negative pressure at 50-4001° C. so that the graphite oxide is converted into graphene, so as to obtain the graphene-based composite material.

The substance to be compounded may be prepared or purchased in advance, or prepared in situ in the dispersing medium.

The graphite oxide, the sulfuric acid and the substance to be compounded may be dispersed in a same dispersing medium. Alternatively, two of the graphite oxide, the sulfuric acid and the substance to be compounded are dispersed and compounded in a same dispersing medium while the other one is dispersed in another dispersing medium, and then the two dispersed systems are mixed and further compounded. Alternatively, the graphite oxide, the sulfuric acid and the substance to be compounded may be dispersed in three different dispersing media, respectively, and then mixed together. No manner how the graphite oxide, the sulfuric acid and the substance to be compounded are compounded, the substance to be compounded is just required to be dispersed in a solution or colloid state during the compounding step. In this way, it is ensured that different substances will be dispersed uniformly after compounded together.

Preferably, the substance to be compounded is 0.1%-90% of the mass of the graphene-based composite material. The content of sulfuric acid in the graphene-based composite material satisfies that the content of sulfur is 1% greater than the total mass of graphite oxide and sulfuric acid.

In this preparation solution of the graphene-based composite material, the substance to be compounded is required to be stable under the conditions of the heat treatment, and includes one or more of metal oxide, metal sulfide, transmission metal, inorganic monomer, ionic liquid and organic polymer.

The ionic liquid includes water-soluble ionic liquid and water-insoluble ionic liquid. The combination of the ionic liquid with graphite oxide and graphene is similar to that of sulfuric acid. The organic polymer may have a very broad selection range, commonly including Nafion, PVDF, PTFE and various conductive polymers.

After the graphite oxide, the sulfuric acid and the substance to be compounded are compounded, if the compounded substance is spread onto the surface of a carrier plate such as a piece of glass to allow the dispersing medium to be fully evaporated, a film is obtained; if the compounded substance is centrifuged or filtered and then dried conventionally, blocks will often be obtained; and, if the compounded substance is freeze-dried, powder will be obtained. Accordingly, the graphene-based composite material obtained by heat treatment may also be powder, film, solid block, etc.

The process of compounding graphite oxide, sulfuric acid and the substance to be compounded to prepare the graphene-based compound may be performed in a water phase in many cases, where the graphite oxide and the sulfuric acid may be well dispersed in the aqueous solution. As metal oxide, sulfide, silicon and other monomers containing surface oxide may also exist in the water phase in a form of colloid, it is possible to add an appropriate surfactant to increase the stability of the dispersed system during the specific implementation. Some ionic liquid and organic polymers are also water-soluble or have water-soluble precursors. For water-insoluble ionic liquid and organic polymers, organic solvents including oil, alcohol, ketone, ether, amine, nitrile and sulphone may be used.

In this preparation solution of the graphene-based composite material, during the process of compounding graphite oxide, sulfuric acid and the substance to be compounded to prepare the graphene-based compound, it is possible to replace the substance to be compounded by the precursor of the substance to be compounded. In the subsequent heat treatment process, the precursor of the substance to be compounded is converted into the substance to be compounded. The precursor of the substance to be compounded mainly includes metal hydroxide which is converted into metal oxide in the heat treatment process.

Hence, the present invention actually further provides a low-temperature preparation method of graphene-based composite material, including the following steps of dispersing graphite oxide, sulfuric acid and a precursor of a substance to be compounded into a solution or colloid so that the graphite oxide, the sulfuric acid and the precursor of the substance to be compounded are mixed with each other in form of molecules or colloid particles, then separating off the dispersing medium, and performing heat treatment in either normal pressure or negative pressure at 50-400° C. so that the graphite oxide is converted into graphene and the precursor of the substance to be compounded is converted into the substance to be compounded, so as to obtain the graphene-based composite material.

In this low-cost preparation method of graphene-based composite material provided by the present invention, the compound of graphite oxide and sulfuric acid is compounded with appropriate inorganic material, organic material or the like. As the sulfuric acid allows the graphite oxide to be converted into graphene, the graphene-based composite material is obtained. The graphene-based composite material prepared by the present invention may be widely applied in catalysts, super capacitors, batteries and other fields.

In conclusion, the normal-pressure and low-temperature preparation technology of graphene and of graphene-based composite material has the advantages of low energy consumption, less emission, low cost, easiness for mass production and the like.

DETAILED DESCRIPTION OF THE PRESENT INVENTION

Figure 1:
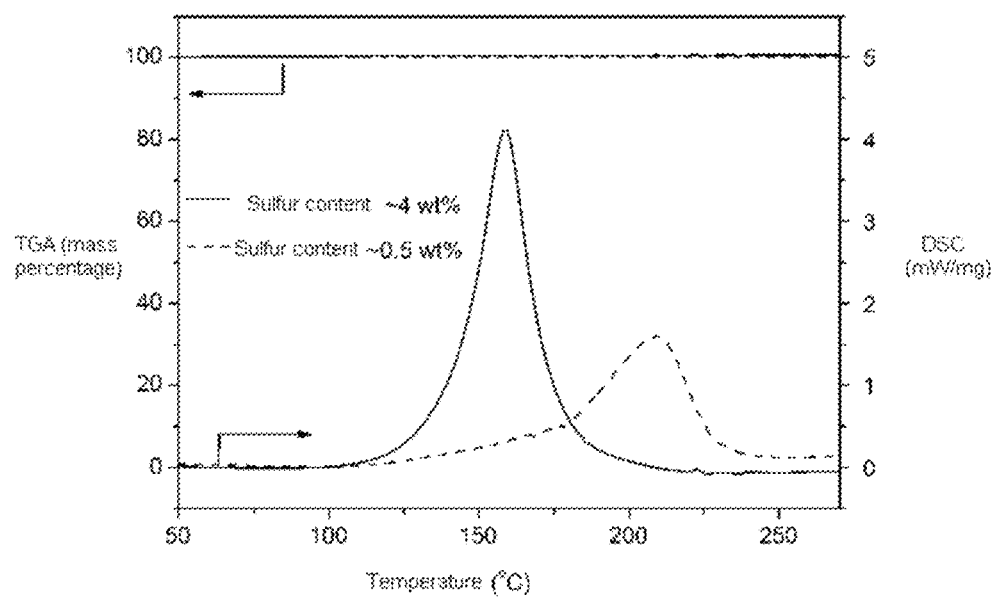
FIG. 1 shows DSC and TGA curves, measured in an airtight aluminum crucible, of a compound of graphite oxide having a sulfur content of 4 wt % and sulfuric acid prepared in Embodiment 1 of the present invention, as well as comparison with the test results of graphite oxide having a sulfur content less than 0.5 wt % under the same conditions, indicating that sulfuric acid significantly catalyzes the thermal reduction of graphite oxide.
Figure 2:
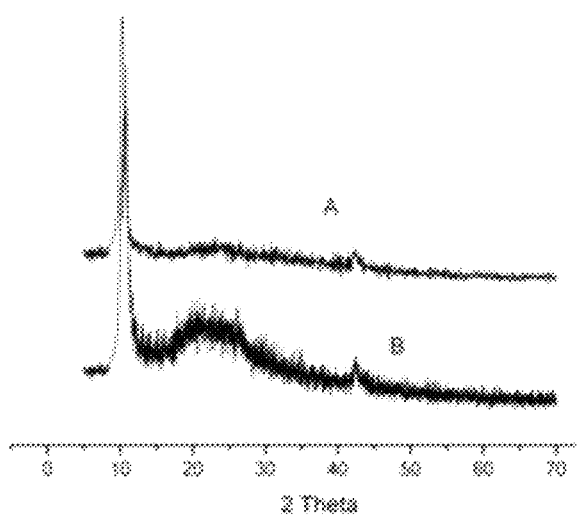
FIG. 2 illustrates XRD curves of a compound of graphite oxide having a sulfur content of about (A) 3 wt % and about (B) 6 wt % and sulfuric acid prepared in Embodiment 2 of the present invention, where it is indicated that graphite oxide begins to be converted into graphene at 50° C. when the sulfur content increases.
Figure 3:
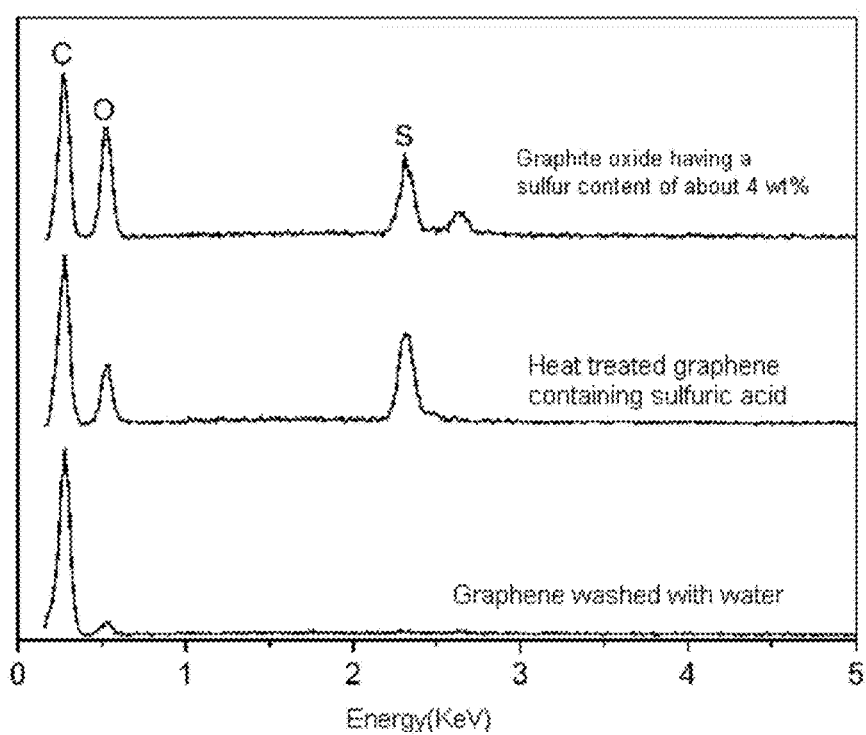
FIG. 3 shows results of EDX tests before and after heat treatment of graphite oxide having a sulfur content of about 4 wt % and before and after washing the resulting product in Embodiment 5 of the present invention, where it is indicated that the compound of graphite oxide and sulfuric acid is heat treated to generate a compound of graphene and sulfuric acid, and the sulfuric acid may be washed and removed from the compound of graphene and sulfuric acid.
Figure 4:
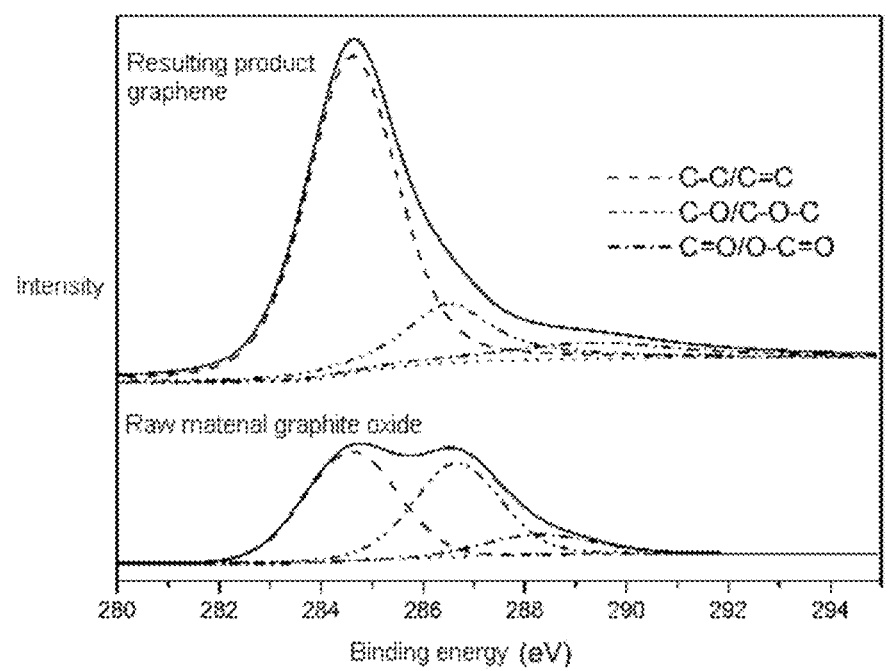
FIG. 4 shows a comparison between results of XPS tests of a compound of graphite oxide having a sulfur content of 4 wt % and sulfuric acid prepared in Embodiment 5 of the present invention and the resulting product, where it is indicated that oxygen-containing groups of the heat treated graphite oxide are greatly reduced and the graphite oxide is converted into graphene.
Figure 5:
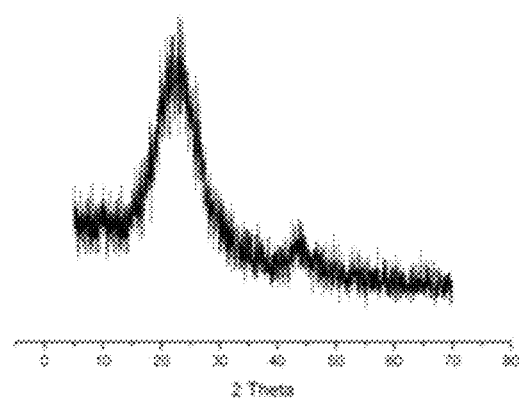
FIG. 5 shows an XRD curve of a resulting product graphene in Embodiment 7 of the present invention.
Figure 6:
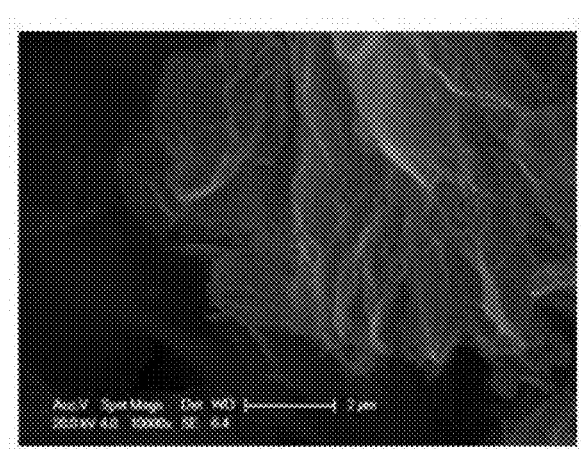
FIG. 6 shows an SEM picture of a resulting product graphene in Embodiment 7 of the present invention.
Figure 7:
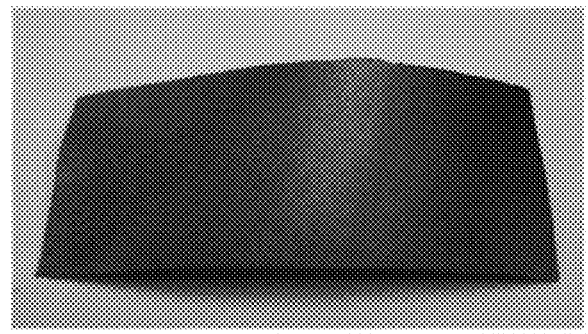
FIG. 7 shows a film of graphene obtained in Embodiment 16.
Figure 8:
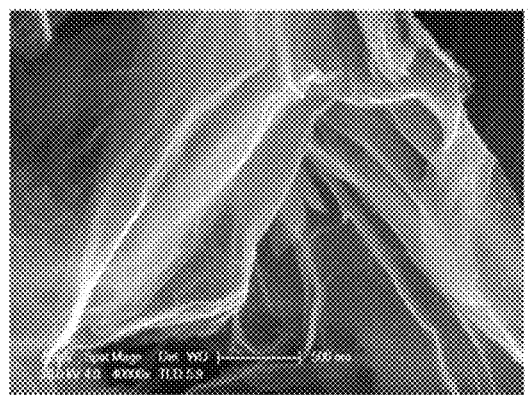
FIG. 8 shows graphene/$SnO_2$ composite material prepared in Embodiment 19, where nanoscale stannic dioxide is clad in graphene.
Figure 9:
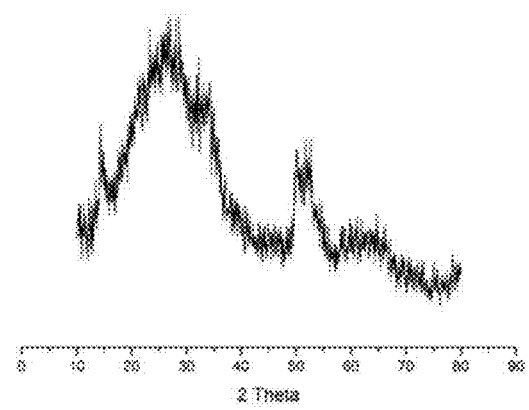
FIG. 9 shows an XRD curve of graphene/$SnS_2$ composite material prepared in Embodiment 21.

The present invention will be further described with reference to the accompanying drawings by embodiments. This description is merely for further describing the present invention and not intended to limit the present invention.

Preparation of a Compound of Graphite Oxide and Sulfuric Acid

Embodiment 1

10 g of graphite powder and 6 g of $NaNO_3$ were uniformly mixed with about 250 mL of concentrated $H_2SO_4$ solution (98 wt %) in an ice-water bath while stirring; then, the mixture was slowly added with 30 g of $KMnO_4$ and left stand below 20° C. for about 15 min, heated up to 35° C. in a constant-temperature water bath for 30 min, added with about 500 mL of distilled water, controlled at a temperature below 100° C., diluted with distilled water till about 1.4 L, stirred for 10 min, added with about 40 mL of 30 wt % $H_2O_2$, left stand to remove the supernatant, diluted and washed with water, and solid-liquid separated for 1-8 times; and the solid was dried at 50° C. for 24 h to obtain a compound of graphite oxide having a sulfur content of 1%-10 wt % and sulfuric acid.

Embodiment 2

15 g of graphite powder and 10 g of $NaNO_3$ were uniformly mixed with and about 400 mL of concentrated $H_2SO_4$ solution in an ice-water bath while stirring; then, the mixture was slowly added with 40 g of $KMnO_4$ and left stand below 20° C. for about 12 min, heated up to 35° C. in a constant-temperature water bath for 40 min, added with about 800 mL of distilled water, controlled at a temperature below 100° C., diluted with distilled water till about 2 L, stirred for 20 min, added with about 50 mL of 30 wt % $H_2O_2$, left stand to remove the supernatant, diluted and washed with 5 wt % HCl solution, solid-liquid separated for 1-8 times; and, the solid was washed with distilled water, solid-liquid separated again, and dried at 50° C. until there was no apparent water, to obtain a compound of graphite oxide having a sulfur content of 1%-10 wt % and sulfuric acid.

Embodiment 3

2-5 g of graphite oxide powder was soaked in 2 mol/L, 4 mol/L and 6 mol/L of sulfuric acid solution for 2-20 h, respectively, and then solid-liquid separated; and the solid was washed with distilled water for 1-3 times and dried at 50° C. until there was no apparent water, to obtain a compound of graphite oxide having a sulfur content of 1%-8 wt % and sulfuric acid.

Preparation of Graphene

Embodiment 4

Several parts of 0.5 g of the compound of graphite oxide having a sulfur content of 6-8% and sulfuric acid were prepared and then kept for 1-40 min at 90° C., 100° C., 120° C., 130° C., 150° C., 200° C. and 250° C. in air, respectively. It was found from XRD and XPS that graphite oxide was converted into graphene.

Embodiment 5

Several parts of 0.5 g of the compound of graphite oxide having a sulfur content of 3-6% and sulfuric acid were prepared and then kept for 1-30 min at 120° C., 150° C., 200° C. and 250° C. in air, respectively. It was found from XRD and XPS that graphite oxide was converted into graphene.

Embodiment 6

Powder, film and block samples of 0.5 g of the compound of graphite oxide having a sulfur content of 4-7% and sulfuric acid were prepared and then roasted in air for above 30 min by sunlight (between 70° C. and 300° C.) collected by a collecting lens. It was found that graphite oxide was converted into graphene.

Embodiment 7

Several parts of 2 g of the compound of graphite oxide having a sulfur content of 4-7% and sulfuric acid were prepared and then kept for 1-30 min at 120° C., 150° C., 200° C. and 250° C. in air, respectively. It was found that graphite oxide was converted into graphene.

Embodiment 8

Several parts of 5 g of the compound agglomerates of graphite oxide having a sulfur content of 4-7% and sulfuric acid were prepared and then kept for 2-30 min at 120° C., 150° C., 200° C. and 250° C. in air, respectively. It was obviously observed that the compound was expanded and graphite oxide was converted into graphene.

Embodiment 9

Several parts of 5 g of the compound agglomerates of graphite oxide having a sulfur content of 4-7% and sulfuric acid were prepared and then kept for 1-30 min at 150° C. in argon, oxygen, hydrogen, carbon dioxide, ammonia gas or the like and in a normal pressure, respectively. It was obviously observed that the compound was expanded and graphite oxide was converted into graphene.

Embodiment 10

0.5 g of the compound agglomerates of graphite oxide having a sulfur content of about 1.5% and sulfuric acid was prepared and then kept for 30 min at 150° C. in air, and it was observed that the compound was not expanded; the compound agglomerates were heated continuously up to 350° C. and kept for 10 min, then it was observed that the compound was expanded and graphite oxide was converted into graphene.

Embodiment 11

Several parts of 0.5 g of the compound of graphite oxide having a sulfur content of 2-3% and sulfuric acid were prepared and then kept for 1-30 min at 150° C., 200° C. and 250° C. in air, respectively. It was found that graphite oxide was converted into graphene.

Embodiment 12

Several parts of 2 g of the compound of graphite oxide having a sulfur content of 4-7% and sulfuric acid were prepared and then kept for 1-30 min at 150° C. at 0.5 atm and 0.1 atm. It was found that graphite oxide was converted into graphene.

Embodiment 13

Several parts of 0.5 g of the compound of graphite oxide having a sulfur content of 5-7% and sulfuric acid were prepared, dispersed in 10 mL of 3M sulfuric acid solution, ultrasonically treated to obtain graphene oxide, solid-liquid separated, and kept for 30 min at 100° C. without washing to retain the sulfuric acid in the resulting solid product. It was found that graphene oxide was converted into graphene.

Embodiment 14

Two parts of 0.1 g of graphite oxide were prepared and then ultrasonically treated in 30 mL of pure water to obtain graphene oxide solution. One part of the graphene oxide solution was slowly added with sulfuric acid till 1M and then solid-liquid separated; and the resulting product was dried at 50° C. and proved by XRD to be graphene. By contrast, another part of graphene oxide solution was directly solid-liquid separated without being added with sulfuric acid; and the resulting product was dried at 50° C. and proved to be graphene oxide. This test indicated the importance of the presence of sulfuric acid, and also showed that the reduction of graphite oxide particles in size was advantageous for the conversion to graphene.

Embodiment 15

Several parts of 2 g of the compound of graphite oxide having a sulfur content of 4-7% and sulfuric acid were prepared and then kept for 1-30 min at 120° C., 150° C., 200° C. and 250° C., respectively; and the resulting product was washed with distilled water and then solid-liquid separated to obtain pure and resulting solid product graphene, with the hydrogen ions, sulfate radicals and other ions in the mixture entering the filtrate. It was found from this test that the washing efficiency of sulfuric acid in the resulting product was significantly higher than that of the compound of graphite oxide and sulfuric acid. In an electrochemical capacity test in 0.5M of $H_2SO_4$ solution, the electrochemical capacity of a film electrode manufactured by the obtained pure graphene may reach 400 F/g or above; the electrochemical specific capacitance of the prepared graphene reached 220 F/g at a high-rate charge/discharge condition of 1 A/g; and the specific capacitance of the graphene may reach 200 F/g at a charge current of 4 A/g. Hence, the graphene showed excellent high-rate charge capability.

Embodiment 16

0.1 g of the compound of graphite oxide having a sulfur content of 1-3 wt % and sulfuric acid was manufactured into a film of 15-20 cm$^2$; and the film was cut into several parts which were slowly heated up to 80° C., 100° C., 120° C. and 150° C. from the room temperature and then kept for 8 h, in which case, the color of the film became black from brown. A graphene film containing sulfuric acid was obtained.

Embodiment 17

0.1 g of graphite oxide having a sulfur content of 1-10% was manufactured into a film of 15-20 cm$^2$; and the film was cut into several parts which were slowly heated up to 60° C., 80° C., 100° C. and 120° C. from the room temperature and then kept for 1-8 h. A graphene film containing sulfuric acid was obtained.

Preparation of Graphene from Graphite Powder

Embodiment 18

2 g of graphite powder and 1 g of $NaNO_3$ were uniformly mixed with 45 mL of concentrated $H_2SO_4$ solution in an ice-water bath and stirred for 30 min; then, the mixture was slowly added with 6 g of $KMnO_4$, reacted for 15 min below 20° C. and then reacted for 30 min in a constant-temperature water bath at 35° C., added with 200 mL of distilled water, controlled at a temperature below 100° C., added with about 6 mL of 30% $H_2O_2$, stirred, and left stand to remove the supernatant, to obtain 20 mL of pasty resulting product; the pasty resulting product was diluted with about 20 mL of diluted water, centrifuged, removed with the supernatant, dispersed and washed with 20 mL of distilled water and then centrifuged; the resulting solid product was dried at 50° C. to obtain agglomerates of a compound of graphite oxide having a sulfur content of about 6 wt % and sulfuric acid; when heated up to 150° C. and then kept for 3 min, the agglomerates were expanded and the graphite oxide was converted into graphene; and the resulting product of expansion was cooled to the room temperature and then washed with distilled water to remove the sulfuric acid and thus to obtain pure graphene.

Preparation of Graphene-Based Composite Material

Embodiment 19

0.2-1 g of the compound of graphite oxide having a sulfur content of 3-7 wt % and sulfuric acid was dispersed in 80 mL of de-ionized water the mixture was added with 400 mg of $SnCl_4.5H_2O$, stirred for 12 h at the room temperature so that $SnCl_4.5H_2O$ was hydrolyzed into stannic oxide, and solid-liquid separated to several parts of graphite oxide based composite material; and the several parts of graphite oxide based composite material were dried at 50° C. and then heat treated at 150° C., 200° C., 250° C. and 300° C. with expansion observed, and washed and dried to obtain graphene/$SnO_2$ composite material. If $SnCl_4.5H_2O$ is replaced by $TiOSO_4$, graphene/$TiO_2$ composite material may be prepared by similar methods.

Embodiment 20

540 mg of $FeCl_3.6H_2O$ was dissolved in water, added with 340 mg of KOH to obtain $Fe(OH)_3$ colloid; the $Fe(OH)_3$ colloid was compounded with 0.2-1 g of the compound of graphite oxide having a sulfur content of 1-3 wt % and sulfuric acid while stirring; the mixture was centrifuged, and the resulting product was dried at 50° C.; the prepared compound was heat treated at 250° C., 300° C. and 350° C., with volume expansion observed, and washed and dried to obtain graphene/$Fe_2O_3$ composite material.

Embodiment 21

(1) 350 mg of $SnCl_4.5H_2O$ or 400 mg of $FeCl_3.4H_2O$ was dispersed in 20 mL of de-ionized water and then added with 153 mg of $CN_2H_4S$; and the mixture was heated in a water bath at 60° C. for 3 h while stirring to obtain nano-$SnS_2$ or nano-FeS colloid;

(2) 0.2-1 g of the compound of graphite oxide having a sulfur content of 3-7 wt % and sulfuric acid was dispersed in 60 mL of de-ionized water, and then stirred and mixed with the sulfide colloid obtained in step (1); and the mixture was centrifuged, and the resulting product was dried at 50° C.; and (3) the dried resulting product obtained in step (2) was heat treated at 140° C. and then washed and dried to obtain $SnS_2$/graphene or FeS/graphene composite material.

Embodiment 22

0.2-1 g of the compound of graphite oxide having a sulfur content of 3-7 wt % and sulfuric acid was dispersed in 40 mL of de-ionized water; the mixture was added with 150 mg of silicon monomer 30 nm in size or $ZrO_2$ 50 nm in size or $SiO_2$ 10 nm in size, and stirred at the room temperature for 6 h; the mixed slurry was spread on the surface of a piece of glass, naturally dried in air, heat treated at 120° C. for 20 h, and finally washed and dried to obtain a film of graphene/Si or $ZrO_2$ or $SiO_2$ composite material.

Embodiment 23

0.2-1 g of the compound of graphite oxide having a sulfur content of 3-7 wt % and sulfuric acid was dispersed in 80 mL of de-ionized water, the mixture was added with 150 mg of ionic liquid of 1-butyl-3-methylimidazole tetrafluoroborate, stirred at the room temperature for 6 h, and centrifuged; the resulting product was dried at 50° C. and then heat treated at 150° C. to obtain the composite material of graphene and 1-butyl-3-methylimidazole tetrafluoroborate.

Embodiment 24

0.2-1 g of the compound of graphite oxide having a sulfur content of 3-7 wt % and sulfuric acid was dispersed in 80 mL of de-ionized water; the mixture was added with 1 g of 5 wt % Nafion solution or 50 mg of polyvinyl alcohol, stirred at the room temperature for 12 h, centrifuged; and the resulting product was dried at 50° C., heat treated at 150° C., and finally washed and dried to obtain the composite material of graphene and Nafion or polyvinyl alcohol.

Embodiment 25

200 mg of Nafion powder, 200 mg of the compound of graphite oxide having a sulfur content of 9 wt % and sulfuric acid and 200 mg of $BmimBF_4$ were dispersed in 5.5 g of DMF as solvent; after fully stirred, the solution was poured into an appropriate filling solvent and then dried at about 60° C. to obtain a film having an area of 20-80 $cm^2$ and a thickness of 0.05-1 mm; and the film was heat treated at 140° C. and then washed and dried to obtain composite material composed of graphene, sulfuric acid, Nafion and ionic liquid.

We claim:

1. A low-temperature preparation method of graphene, characterized in that a compound of graphite oxide and sulfuric acid is heat treated in either normal pressure or negative pressure at 50-400° C. so that the graphite oxide is converted into graphene.

2. The method according to claim 1, characterized in that the compound of graphite oxide and sulfuric acid is a compound obtained by soaking graphite oxide in sulfuric acid and then performing solid-liquid separation.

3. The method according to claim 1, characterized in that the compound of graphite oxide and sulfuric acid is a compound obtained by oxidizing graphite in a system containing sulfuric acid into graphite oxide and then performing solid-liquid separation.

4. The method according to claim 1, characterized in that the heat treatment lasts for 0.5-40 min.

5. The method according to claim 1, characterized in that, in the compound of graphite oxide and sulfuric acid, sulfur in the sulfuric acid is 1%-9% of the total mass of graphite oxide and sulfuric acid.

6. The method according to claim 2, characterized in that the heat treatment lasts for 0.5-40 min.

7. The method according to claim 2, characterized in that, in the compound of graphite oxide and sulfuric acid, sulfur in the sulfuric acid is 1%-9% of the total mass of graphite oxide and sulfuric acid.

8. The method according to claim 3, characterized in that the heat treatment lasts for 0.5-40 min.

9. The method according to claim 3, characterized in that, in the compound of graphite oxide and sulfuric acid, sulfur in the sulfuric acid is 1%-9% of the total mass of graphite oxide and sulfuric acid.

10. A low-temperature preparation method of graphene-based composite material, comprising the following steps of: dispersing graphite oxide, sulfuric acid and substance to be compounded in a dispersing medium so that the graphite oxide, the sulfuric acid and the substance to be compounded are mixed with each other in form of molecules or colloid particles, then separating off the dispersing medium, and performing heat treatment in either normal pressure or negative pressure at 50-400° C. so that the graphite oxide is converted into graphene, so as to obtain the graphene-based composite material.

11. The preparation method according to claim 10, characterized in that the substance to be compounded is prepared in situ in the dispersing medium.

12. The preparation method according to claim 10, characterized in that substance to be compounded comprises one or more of metal oxide, metal sulfide, transmission metal, inorganic monomer, ionic liquid and organic polymer.

13. The preparation method according to claim 1, characterized in that substance to be compounded comprises one or more of metal oxide, metal sulfide, transmission metal, inorganic monomer, ionic liquid and organic polymer.

14. A low-temperature preparation method of graphene-based composite material, comprising the following steps of: dispersing graphite oxide, sulfuric acid and a precursor of a substance to be compounded into a solution or colloid so that the graphite oxide, the sulfuric acid and the precursor of the substance to be compounded are mixed with each other in form of molecules or colloid particles, then separating off the dispersing medium, and performing heat treatment in either normal pressure or negative pressure at 50-400° C. so that the graphite oxide is converted into graphene and the precursor of the substance to be compounded is converted into the substance to be compounded, so as to obtain the graphene-based composite material, wherein the precursor of the substance to be compounded is metal hydroxide.

* * * * *